United States Patent [19]
Yates

[11] 3,979,621
[45] Sept. 7, 1976

[54] MICROCHANNEL PLATES

[75] Inventor: Colin K. Yates, Sturbridge, Mass.

[73] Assignee: American Optical Corporation, Southbridge, Mass.

[22] Filed: June 4, 1969

[21] Appl. No.: 832,552

[52] U.S. Cl. ............... 313/105 CM; 313/103 CM; 250/213 R
[51] Int. Cl.[2] ........................................ H01J 43/04
[58] Field of Search ............. 250/213 R; 313/103, 313/105, 103 CM, 105 CM

[56] References Cited
UNITED STATES PATENTS

| | | | |
|---|---|---|---|
| 3,128,408 | 4/1964 | Goodrich et al. | 313/103 X |
| 3,240,931 | 3/1966 | Wiley et al. | 313/103 X |
| 3,407,324 | 10/1968 | Rome | 313/105 X |
| 3,449,582 | 6/1969 | Sackinger | 250/213 |

Primary Examiner—Malcolm F. Hubler
Attorney, Agent, or Firm—William C. Nealon

[57] ABSTRACT

An electron multiplier channel plate comprised of a web structure of open channels fused within a solid glass annulus. Inner walls of the channels are constructed of a high lead content glass having its electrical resistance lowered by treatment at high temperature in a reducing atmosphere. Outer walls of the channels are formed of a glass which remains rigid during the treatment at high temperature whereby the tendency for shrinking of the web structure along the inner boundary of the solid glass annulus is prevented.

5 Claims, 7 Drawing Figures

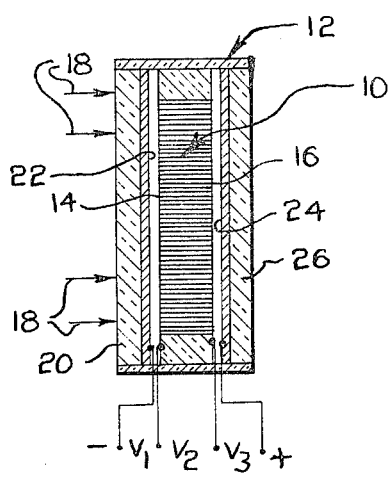
Fig. 1
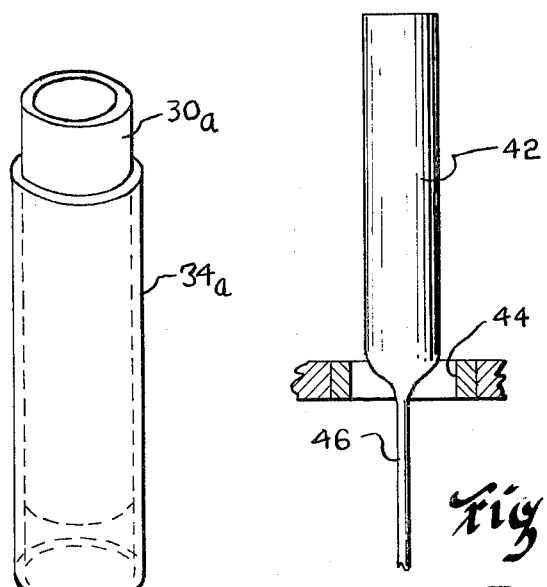
Fig. 2
Fig. 3
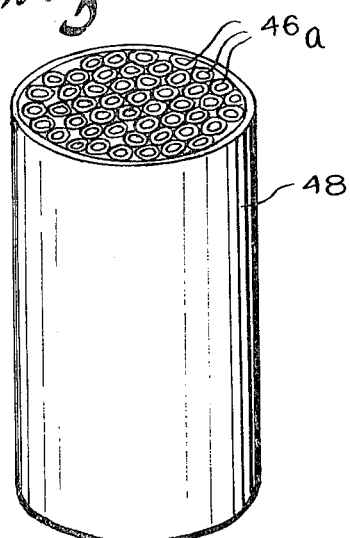
Fig. 4
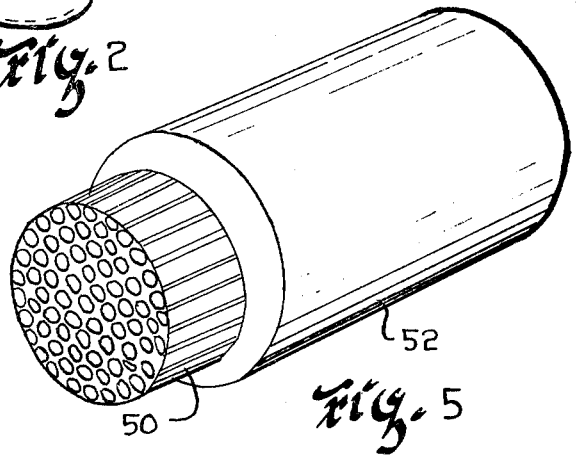
Fig. 5
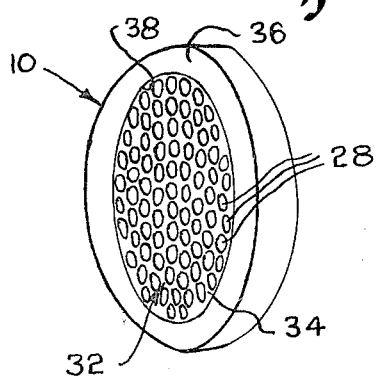
Fig. 6
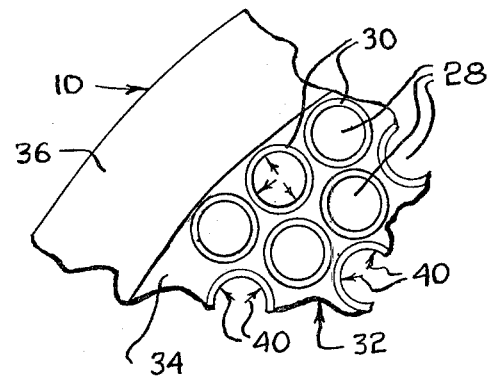
Fig. 7
INVENTOR.
COLIN K. YATES
BY
AT TORNEY

MICROCHANNEL PLATES

BACKGROUND OF THE INVENTION

1. Field Of The Invention

Electron multiplier channel plates and method of making same.

2. Description Of The Prior Art

Glass multi-channel plates used to produce electron multiplication in image intensifier devices and the like are commonly formed of lead containing glasses which are treated in a reducing atmosphere at high temperature to produce lead-enriched surfaces along walls of the channels. These surfaces serve both as electrical conductors and secondary electron emitters for electrons colliding with walls of the channels during acceleration therethrough.

In rendering such plates readily adaptable to being secured within glass envelopes of image intensifier tubes and the like and also readily adaptable to the reception of electrode contacts on opposite faces thereof within such tubes, it is highly desirable that the channel structure of such plates be supported within and by a solid glass annulus. Thus, the annulus may be used as means for connecting the plate to side walls of an electron tube envelope and also as means for receiving electrode contacts without such contacts being in a position to interfer with electron transmitting channels and/or other elements within the electron tube.

Heretofor, however, treatment of a channel structure formed entirely of a high lead content glass in a reducing atmosphere at relatively high temperature has been found to produce the adverse effects of shrinkage of the channel structure as a whole and lowering of its expansion coefficient. These effects being caused by the removal of oxygen from the glass as its lead oxide is reduced, set up stresses at the boundary of the channel structure and a solid glass annulus or other such means within which the structure may be supported. If the stress is not sufficiently great to cause a breakage between the channel structure and glass annulus, as is frequently the case, it is generally sufficient to render the resulting microchannel plate extremely fragile and subject to breakage during its placement within an electron tube envelope and/or during subsequent use thereof in the tube.

The present invention relates to improvements in electron multiplier channel plates having outer glass annuli wherein greater stability and strength of structure is afforded.

SUMMARY OF THE INVENTION

In view of the fact that lead containing glasses which are suitable for the manufacture of electron multiplier channel structures become soft enough to flow and cause shrinkage of such structures when subjected to temperatures used to reduce the lead oxide on their surfaces as a result of the removal of oxygen therefrom, it is an aim of this invention to prevent the setting up of stresses in the channel plate structures.

According to the present inventive concept, a web of open channels which is fused within a solid glass annulus is made up of a great number of fiber-like tubules all fused together in side-by-side relationship with each other. These tubules each comprise an inner thickness of the lead containing glass, ultimately used as a semiconductor and secondary electron emitter, and an outer thickness or layer of a glass which will remain rigid at the relatively high temperature required for reducing lead oxide on the inner wall of the tubule. Accordingly, with such double-walled tubules all fused together in side-by-side relationship as the web structure of the channel plate, shrinkage of the overall dimension of the web structure is prevented during treatment in the reducing atmosphere. The stress introduced into the structure, as oxygen is removed therefrom, is relieved by a slight shrinkage or thinning of the inner channel wall and a corresponding slight increase in the hole size of each channel. Thus, a stress pattern is not set up at the boundary between the web structure and the surrounding solid glass annulus whereby a stable micro-channel plate of improved strength and having a solid area about its periphery on which to make electrode contacts is produced.

Details of the invention will become more fully understood by reference to the following description and the accompanying drawing.

DESCRIPTION OF THE DRAWING

FIG. 1 is a diagrammatic cross-sectional view of an exemplary image amplifier tube incorporating an embodiment of this invention;

FIGS. 2-5 diagrammatically illustrate steps in the method of producing multi-channel electron multiplier plates according to principles of this invention;

FIG. 6 is an illustration, in perspective, of an electron multiplier channel plate produced according to the present inventive concept; and FIG. 7 is a greatly enlarged fragmentary plan view of the plate.

DESCRIPTION OF THE PREFERRED EMBODIMENTS

Channel plate 10 internally of image intensifier tube 12 (FIG. 1) is exemplary of a type of multi-channel structure to which this invention is more particularly directed.

Plate 10, preferably having many thousand parallel channels each extending from one face 14 to another face 16 thereof is adapted to receive a pattern of electrons corresponding to the pattern of an image intended to be intensified by tube 12.

In the illustrated embodiment of tube 12, image forming light represented by arrows 18 is directed through face plate 20 upon photocathode 22 which emits image forming electrons. An electrical potential $V_1$ (e.g. 500 v) applied between the photocathode and channel plate 10 draws the image forming electrons to face 14. Another potential $V_2$ (e.g. 1000 v) accelerates these electrons through the channels in plate 10 with multiplication by secondary emission of electrons from walls of the channels taking place. The pattern of electrons amplified by multiplication in plate 10 is accelerated to phosphor layer 24 within tube 12 by another potential $V_3$ (e.g. 5000 v) and is converted by the phosphor layer into a correspondingly intensified light image. The light image is transmitted through output face plate 26 of tube 12. Face plates 20 and 26 may each be formed of light-conducting fibers all fused together in vacuum-tight side-by-side relationship with each other or each may comprise a solid glass plate as illustrated in FIG. 1.

Referring more particularly to details of channel plate 10, it can be seen in FIGS. 6 and 7 that channels 28 extending through plate 10 each have an inner wall 30 (FIG. 7) made up of a high lead content glass having a lead-enriched inner surface extending along its entire length produced by treatment of plate 10 in a reducing atmosphere at an elevated temperature of for example 650°F. to 1000°F. This lead-enriched surface along inner walls of each of channels 28, being semiconductive to electric current, serves to accelerate electrons to channels 28 with multiplication thereof by secondary emission from the channel walls.

Those interested in details concerning the lowering of surface resistance of high lead content glass by reducing the lead oxide at elevated temperatures in reducing atmospheres such as hydrogen may refer to the publication entitled "Journal Of The American Ceramic Society," Vol. 34, 1951, pp. 14–27.

Surrounding each wall 30 of channels 28 is matrix glass 34 which is characterized by its ability to remain rigid or have a viscosity above the strain point at the temperature used to produce the lead-enriched surfaces of channels 28. Glasses suitable for this purpose are, for example, soda lime or lanthanum base glasses. Glass annulus 36 into which web structure 32 is positioned and fused along boundary line 38 is also formed of a similar glass having a coefficient of expansion compatible with that of matrix glass 34 and characterized to also remain rigid at the temperature used to produce the lead-enriched surfaces along channels 28. Accordingly, during treatment of channel plate 10 in a reducing atmosphere (e.g. hydrogen environment) within a furnace, not shown, to produce the aforesaid lead-enriched surfaces along channels 28, the normal shrinkage of the high lead content glass of inner walls 30 due to removal of oxygen therefrom is restricted by the rigid matrix glass 34 to directions only radially of channels 28 as indicated by small arrows 40 in FIG. 7. Stress introduced into the glasses of the channel plate as oxygen is removed from walls 30 is relieved by these walls thinning and the hole size correspondingly increasing. Therefore, a stress pattern is not set up at boundary 38 between web 32 and annulus 36 and a stable microchannel plate 10 of improved strength results. Opposite sides of annulus 36 provide a solid area to which electrode contacts may be made without interference with web structure 34.

With respect to the matter of making the aforesaid electrode contacts, the customary electrodes (not shown in the drawing) are applied to each of opposite faces 14 and 16 of plate 10 preferably as thin coatings of vacuum deposited chromium or other suitably electrically conductive material discriminately around corresponding open ends of channels 28.

Referring more particularly to FIGS. 2–5, it will be seen that channel plate 10 may be formed by first placing a relatively large tube 30a of high lead content glas within a second tube 34a of a glass preselected to ultimately form matrix 34. The assembly 42 of tubes 30a and 34a may, for example, be in the order of one inch in diameter and many inches long. Assembly 42 (FIG. 3) is heated adjacent one of its ends by heating element 44 and drawn into an elongated tubule 46. Tubule 46 is cut into a number of lengths 46a which are assembled within a holding tube of glass 48 for heating and fusion to one another into the form of a boule.

As it is well-known in this art, any number of intermediate steps of redrawing the assembled lengths 46a, cutting and reassembling to form the unit illustrated in FIG. 4 may be used to the extent necessary to reduce the inner hole diameter of tubules 46a to a desired micro-channel size. Channel diameters in the order of from 10 to 30 microns are desirable.

With tubules 46a finally fused together, holding tube 48 is preferably ground away or otherwise removed from the fused assembly of tubules 46a. Boule 50 of tubules 46a is then fitted within tube 52 having a wall thickness equal to or approximating that desired of annulus 36. With boule 50 inserted into tube 52 the resulting assembly is heated to a temperature sufficient to fuse boule 50 and tube 52 together along the boundary line 38 shown in FIGS. 6 and 7. Proper annealing and cooling cycles are observed during the performance of all heating and fusing operations herein described.

Channel plates such as plate 10 illustrated in FIGS. 1, 6 and 7 are formed by cutting transversely through the fused assembly of boule 50 and tube 52 wherein the thickness of tube 52 forms annulus 36. The usual grinding and polishing of opposite faces of each plate so formed and vacuum depositing of electrodes thereupon completes th article.

It should be understood that various well-known techniques of supported glass tubes and tubules during fusing and drawing operations which prevent collapse or distortion of the tube lumens may be incorporated in the present method. One such technique, for example, may involve the placement of a supporting core of glass within the innermost lumen of the initial assembly of tubes to be drawn, e.g. the assembly of tubes 30a and 34a, FIG. 2. In such a case, the supporting glass, being dissolvable by selective etching would be removed from plate 10 to form open channels 28 prior to or following the grinding and polishing of faces 14 and 16 thereof.

I claim:
1. A channel plate comprising:
   a web structure of glass having a multiplicity of juxtaposed channels extending through said structure from one face to another face thereof, said channels having inner walls formed of lead-containing glass each surrounded by and fused to a matrix glass having a higher softening point than that of said lead-containing glass; and
   a rim of solid glass extending around and fused to said web structure.

2. A channel plate according to claim 1 wherein lead oxide along the exposed inner surfaces of said channels is converted into an electrical semi-conducting layer.

3. A channel plate according to claim 1 wherein said web structure is disk-shaped and said rim comprises an annulus of solid glass.

4. A channel plate according to claim 1 wherein said faces of said web structure and adjoining sides of said rim of solid glass are in substantially flush relationship with each other.

5. A channel plate according to claim 4 wherein a thin coating of electrical conducting material is extended over each of said faces of said web structure and corresponding edges of said rim, said coatings being formed discriminately around respectively adjacent opposite open ends of said channels.

* * * * *